April 7, 1925.

J. T. LAUGHLIN

EYEGLASS MOUNTING

Filed Sept. 17, 1923

1,532,323

Inventor
James T. Laughlin
By J. Ralph Hoge
Attorney

Patented Apr. 7, 1925.

1,532,323

UNITED STATES PATENT OFFICE.

JAMES T. LAUGHLIN, OF SANTA BARBARA, CALIFORNIA.

EYEGLASS MOUNTING.

Application filed September 17, 1923. Serial No. 663,089.

*To all whom it may concern:*

Be it known that JAMES T. LAUGHLIN, a citizen of the United States, residing at Santa Barbara, in the county of Santa Barbara and State of California, has invented certain new and useful Improvements in Eyeglass Mountings, of which the following is a specification.

This invention relates to improvements in eye glass mountings, having for an object the provision of a structure in such a mounting, whereby the lenses are retained in proper position with respect to the eyes of the wearer.

A further object of the invention is to provide an eye glass mounting formed from a single strip of sheet metal; the relative position of the several parts being such as will simplify and reduce the expense of manufacture.

It is likewise an object of the invention to provide grips or guards which are formed integral with the strip of sheet metal and adapted to engage the super-orbital arch and materially assist in retaining the glasses in proper position upon the eyes of the wearer.

Other objects will be in part obvious and in part pointed out hereinafter.

In order that the invention and its mode of operation may be readily understood by persons skilled in the art, I have in the accompanying illustrative drawing, and in the detailed following description based thereon, set out one possible embodiment of the same.

Figure 4:
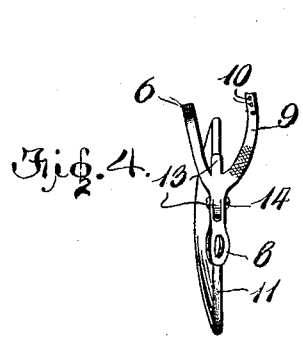
Figure 4 is a central transverse section of the invention.
Figure 5:
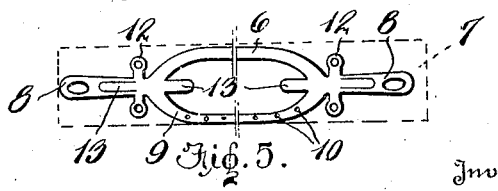
Figure 5 is a plan view showing the configuration of the mounting before the same is bent for attachment to the lens.

Having more particular reference to the drawings, in connection with which like characters of reference will designate corresponding parts throughout, the improved eye glass mounting, as stated, is formed from a single strip of sheet metal and comprises a nose bridge 6 which as shown in Figure 5 extends from one side edge of a blank 7 and has nose grips 8 formed at the opposite ends of said bridge. As shown in Figure 4 of the drawing, the nose grips 8 are provided with openings which are adapted to receive small posts of flesh formed on the nose under the pressure of said grips, and as shown, the grips are twisted somewhat in order that they may more comfortably engage the nose.

Figure 1:
Figure 1 is a view illustrating the application of the glasses with my improved mounting.
Figure 2:
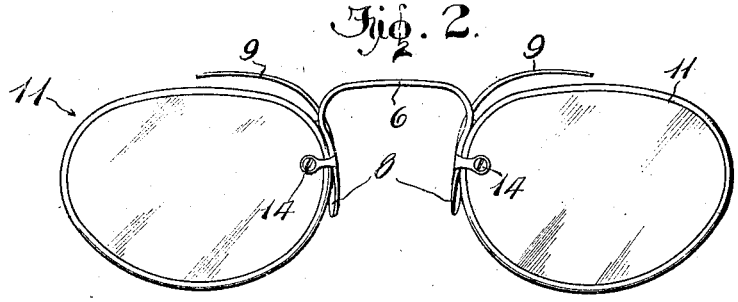
Figure 2 is a front elevation illustrating the invention.
Figure 3:
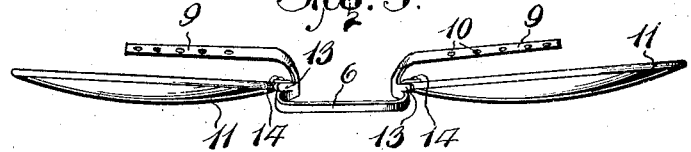
Figure 3 is a top plan view thereof.

Arranged opposite the nose bridge 6 is a pair of super-orbital arch engaging grips or fingers 9, said grips extending from the mounting at the point of juncture of said bridge 6 and nose grips 8 and extending upwardly and away from each other as clearly shown in Figure 3. Preferably these grips or fingers 9 are decreased in width and thickness towards their extremities and provided with small apertures 10, which when the grips are engaged with the super-orbital arch, assist materially in retaining the glasses upon the eyes of the wearer by forming posts of flesh upon the super-orbital arch, said posts being positioned in the apertures 10 as will be readily understood. It is apparent that due to the provision of the super-orbital arch engaging grips that the usual pressure of the nose grips upon the nose may be considerably reduced, thereby rendering the wearing of glasses much more comfortable than where the ordinary grips are employed.

In order that the mounting may be reliably and positively attached to lens 11, a pair of opposed ears 12 is provided at the point of juncture of the bridge 6 and nose grips 8, said ears being provided with screw receiving apertures, as indicated in Figure 5. To further facilitate the attachment of the mounting to the lens 11, I have provided a pair of oppositely disposed fingers 13 arranged substantially at right angles to the ears 12 and as shown in Figure 4, extending above and below said ears.

From observation of Figure 3, it will be seen that the grips 9 which engage the super-orbital arch of the wearer are arranged in a substantially parallel relation as regards the lens 11. Through this arrangement, it is possible to retain the glasses close to the wearer's eyes, thereby providing comfort and in addition, preventing dust and dirt from getting into the eyes.

The mode of attachment may be briefly described as follows: The nose bridge 6 is first bent to the proper and desired shape, after which the super-orbital arch engaging grips are curved to conform to the curvature of the arch of the particular wearer; the fingers 13 are then bent or curved slightly so as to bear against the periphery of the lens 11 or their frame and then the ears 12 are bent at right angles in the same direction so as to permit of the passage of an attaching screw 14 through the apertures in the ears and through the lens. It is apparent that, through providing a mounting of this character, wherein the same may be stamped from a single sheet of material and at a single operation, that the cost of manufacture and the simplicity and ease of attachment is unusual.

Manifestly, the construction shown in capable of considerable modification and such modification, as is within the scope of my claims, I consider within the spirit of my invention.

I claim:

1. A lens mounting formed from a single strip of sheet metal and comprising a nose bridge, nose grips integrally formed at the lower ends of the sides of said bridge, lens clamps arranged at the juncture of the bridge and grips and formed from the same strip of metal, a pair of opposed fingers stamped from the strip and adapted to bear against the periphery of the lens at points immediately above and below the point of attachment of said lens clamps, and a pair of super-orbital arch engaging fingers formed with said grips.

2. A lens mounting formed from a single strip of sheet metal and comprising a nose bridge, a pair of nose grips integrally formed at the lower ends of said nose bridge, a pair of opposed ears formed from said strip at the juncture of said bridge and grips and adapted to be bent to clamp the adjacent lens, a pair of opposed fingers formed from the strip and arranged at right angles to said ears, said fingers being positioned to engage the periphery of the lens at points above and below said clamp forming ears, and a pair of super-orbital arch engaging grips formed integrally with the main strip of metal, said grips extending from the strip at the juncture of said upper lens engaging fingers, said grips being decreased in width towards the ends to increase resiliency.

3. A lens mounting in which all parts are stamped from a single strip of sheet metal, said mounting including a nose bridge, a pair of super-orbital arch engaging fingers extending upwardly and outwardly from the ends of said nose bridge, a pair of alined lens clamping ears, formed below the juncture of the nose bridge and each arch engaging finger, a pair of oppositely directed fingers extending at right angles to the lens clamping ears to engage the edge of the adjacent lens, and a pair of nose grips formed below the lens clamping ears.

4. A lens mounting in which all parts are stamped from a single strip of sheet metal, said mounting including a nose bridge, a pair of super-orbital arch engaging fingers extending upwardly and outwardly in opposite directions from the end of said bridge, a lens periphery engaging finger extending upwardly at the juncture of each arch engaging finger and nose bridge, nose grips extending downwardly from said point of juncture, a second lens periphery engaging finger to co-act with the first named finger and stamped from the nose grip forming portion, and pairs of opposed apertured ears arranged at right angles to the nose clamps and adapted to engage opposite faces of the lenses.

In testimony whereof I affix my signature.

JAMES T. LAUGHLIN.